UNITED STATES PATENT OFFICE.

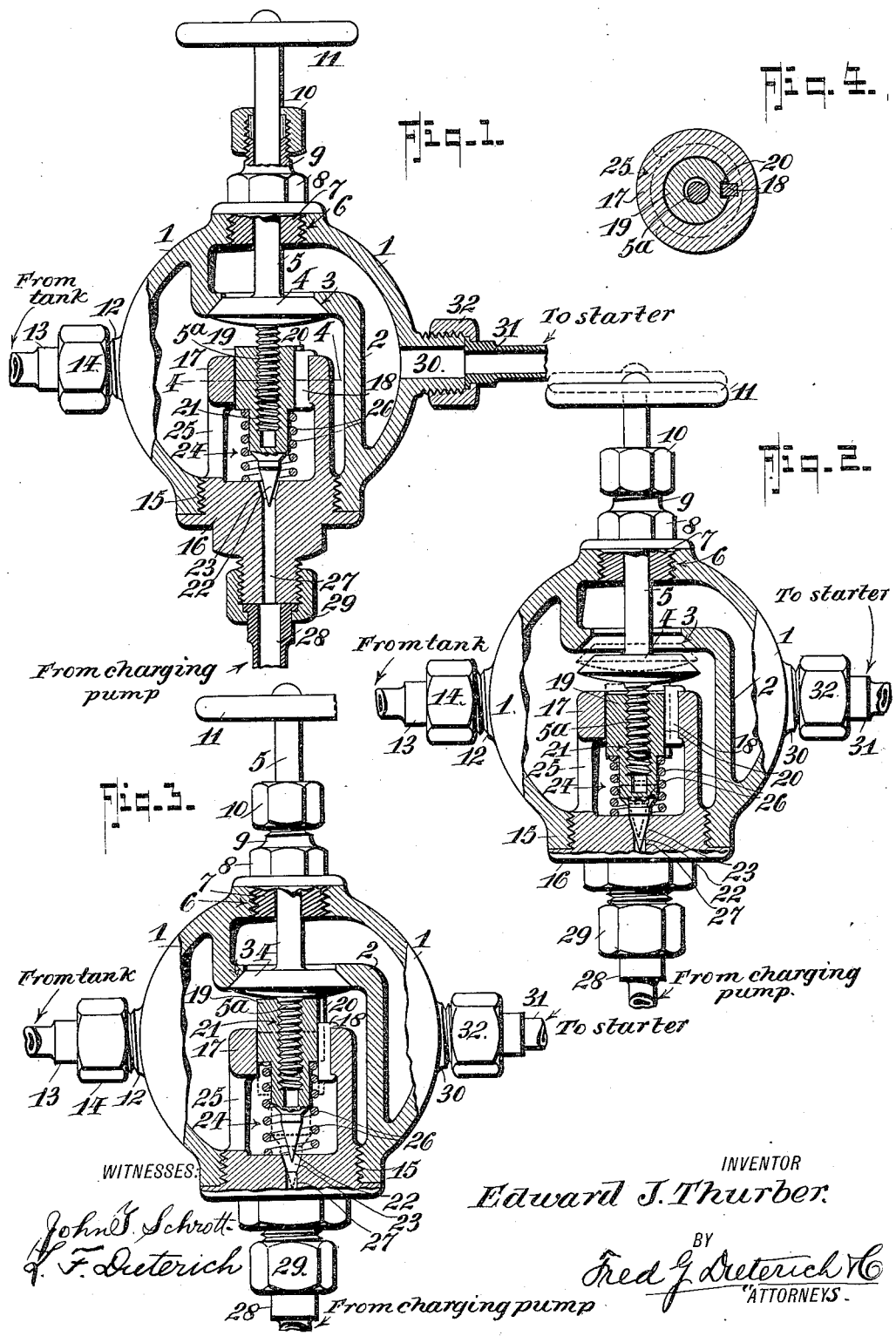

EDWARD J. THURBER, OF NEW ORLEANS, LOUISIANA, ASSIGNOR TO THURBER ROTARY STARTER CO., OF NEW ORLEANS, LOUISIANA, A CORPORATION.

VALVE DEVICE.

1,064,565.   Specification of Letters Patent.   Patented June 10, 1913.

Application filed August 17, 1912.   Serial No. 715,591.

*To all whom it may concern:*

Be it known that I, EDWARD J. THURBER, residing at New Orleans, in the parish of Orleans and State of Louisiana, have invented certain new and useful Improvements in Valve Devices, of which the following is a specification.

My invention is an improved valve device comprising two reciprocating valves one of which is also rotatable that is particularly designed and adapted for use in connection with automobile self starters and the like, although it is of more or less general application.

In automobile starters of the compressed air type, it is the custom to provide a storage tank, a pump with a pipe connection to the tank for supplying it with air under pressure, and a starting motor connectible with the engine shaft and piped up with the tank or reservoir whereby the compressed air may be employed to start the engine. In these devices two valves are usually employed, one in the duct between the pump and the reservoir, and one in the duct between the reservoir and the starting motor, so that when the machine is not in commission, both ducts may be closed to retain the air pressure within the reservoir. This requires the shutting down of both valves, and should the operator forget to shut one of the valves, or not shut it properly, the air from the reservoir will generally escape, and when it is most needed will be found absent. It is to avoid this trouble that I have devised my present form of valve, which is of the duplex nature, to take place of the two valves now employed in these devices.

My present invention comprises a valve casing having three outlets, one of which is connectible with the air pump, another with the storage reservoir, and the third with the starting motor. The valve mechanism is also provided with a valve stem that carries two valves, one of which controls the passage of fluid from the reservoir duct to the starting motor duct, while the other valve simply controls the passage from the pump duct to the storage reservoir duct. Means are also provided whereby both valves proper may be seated to close off both valve passages, or both valves may be unseated at the same time to permit all of the ducts to be thrown into communication with one another, or one valve proper may be kept seated while the other remains open. Means are also provided whereby the degree of opening of either of the valves may be adjusted.

The present invention is a modification of that disclosed in my copending application, Serial No. 701,177, filed on June 3, 1912.

The invention, in its more detailed nature, includes those novel details of construction, combination and arrangement of parts, all of which will be first fully described, and then be specifically pointed out in the appended claims, reference being had to the accompanying drawings, in which:—

Figure 1 is a central vertical longitudinal section of the valve mechanism in the normal operative position, with the valved passage between the reservoir duct and starting motor duct closed, and that between the pump duct and storage reservoir duct opened. Fig. 2 is a view similar to Fig. 1 showing the position of the parts when the valve stem has been depressed, to close the pump duct and open the valved passage between the tank and the starter ducts. Fig. 3 is a view similar to Figs. 1 and 2 showing the lower valve proper carrying member screwed up to its maximum distance to allow for the maximum opening movement of the valves. Fig. 4 is a cross section on the line 4—4 of Fig. 1.

In the drawings like numbers of reference designate like parts in all the figures.

1 is the valve casing which is provided with the usual internal web 2, that divides the casing into two chambers, and it is provided with the valve seat passage 3.

4 is the valve proper or valve head that engages the seat 3 and is a part of the valve stem 5. The casing 1 has a threaded opening 6 for the passage of the valve stem 5, and the plug 7, that has a nut portion 8, by means of which it can be screwed in place. It also has a neck 9 that coöperates with the gland nut 10 to effect the sealing of the stem 5 in the passage to the member 7. The stem 5 has the usual hand wheel 11 and it is also provided with a threaded shank $5^a$ that screws into the threaded bore 21 of the lower valve carrying member 19, which has a key way 20 to receive the key 18 that secures the member 19 in the opening of the bridge portion 17, it being understood that the member 19 is free to reciprocate on its longitudinal axis in the member 17, but is held from rotating by the key 18.

12 is the outlet of the valve casing 1 adapted to be connected to the storage reservoir tank (not shown) by means of the duct 13 which is secured by a union 14 in the usual way. The bottom of the valve casing 1 is bored and tapped at 15 to receive the plug 16, that carries the bridge member 17, the plug 16 having a chamber 24 whose outlet 25 is in communication with the interior of the valve casing 1 and it also has an apertured nipple or neck 27 to which the duct 28 from the pump (not shown), is connected by a union 29. The lower end of the member 19 is formed as a needle valve proper 22 to engage the valve seat 23, of the member 16, a spring 26 continuously tending to force the member 19 upwardly to unseat the valve proper 22 and seat the valve proper 4.

30 is the outlet duct of the valve casing 1 which is in communication with the duct 31 that delivers into the starting motor (not shown), the duct 31 being secured to the outlet duct 30 by the usual union 32.

In operation, assume that both valves 22 and 4 are seated. At this time, the valve 22 will be positioned as shown in dotted lines in Fig. 3, with the member 19 screwed down its maximum distance. Now assume that it is desired to deliver air from the storage tank to the starting motor and allow the pump to act to store up air in the reservoir, the operator turns the wheel 11 a distance sufficiently to screw up the member 19 the desired degree. He thereupon pushes down on the wheel 11 to move the valve proper 4 off the seat 3, which act, at the commencement of the movement, allows both valves 4 and 22 to be unseated as indicated in dotted lines in Fig. 2, while at the limit of the downward movement of the stem 5 the valve proper 22 will engage the seat 23 to close the passage from the pump duct while opening the passage through the web 2 to its maximum degree. Upon releasing the stem 5 the spring 26 together with the air pressure on the valve proper 4 will serve to close the passage through the web 2 and again open the passage to the duct from the air pump.

When it is desired to close off communication between the ducts 28 and 13, and 13 and 31, the operator simply unscrews the stem 5 by turning the wheel 11 until the parts are again positioned as shown in Fig. 3, when both valves proper 4 and 22 will be tightly engaged with their respective seats 3 and 23. When the parts are in their normal position they are arranged as indicated in Fig. 1.

From the foregoing description taken in connection with the accompanying drawing it is thought the complete construction, operation and advantages of the invention will be readily apparent to those skilled in the art to which this invention relates.

What I claim is:—

1. In a valve device, a valve casing having three outlet passages and two valves proper for controlling communication between said passages, connections between said valves proper in virtue of which upon the commencement of movement of the connection one of said valves proper will be unseated, and upon further movement the other valve proper will be seated, and means continuously tending to unseat one of said valves and simultaneously seat the other valve, said connection constituting means in virtue of which both of said valves may be "held" to their seats.

2. A valve mechanism comprising a casing having three passages communicating with the exterior, a valve adapted for either rotary or reciprocatory motion for controlling communication between one of said passages and the other two passages, a reciprocating valve for controlling one of said two passages, and a single means for seating or unseating both of said valves.

3. A valve mechanism comprising a casing having an internal web provided with a passage having a valve seat, said casing having two ducts located on opposite sides of the valve seat for external communication, a valve proper for engaging said valve seat to control the passage between said two ducts, a valve stem carrying said valve proper and projecting to the outside of said casing, said valve stem being either reciprocable or rotatable, a third duct having a valve seat for effecting communication with the interior of one part of said valve casing and the exterior thereof, a valve within the valve casing for controlling the passage through said last named duct, and connections between said last named valve and said first-named valve, whereby the movement of said stem may effect the operation of said last named valve.

4. A valve mechanism comprising a casing having an internal web provided with a passage having a valve seat, said casing having two ducts located on opposite sides of the valve seat for external communication, a valve proper for engaging said valve seat to control the passage between said two ducts, a valve stem carrying said valve proper and projecting to the outside of said casing, said valve stem being either reciprocable or rotatable, a third duct having a valve seat for effecting communication with the interior of one part of said valve casing and the exterior thereof, a valve within the valve casing for controlling the passage through said last named duct, and connections between said last named valve and said first named valve, whereby the movement of said stem may effect the operation of said last named valve, and means continuously tending to open the said last named valve.

5. A valve mechanism comprising a casing having an internal web provided with a passage having a valve seat, said casing having two ducts located on opposite sides of the valve seat for external communication, a valve proper for engaging said valve seat to control the passage between said two ducts, a valve stem carrying said valve proper and projecting to the outside of said casing, said valve stem being either reciprocable or rotatable, a third duct having a valve seat for effecting communication with the interior of one part of said valve casing and the exterior thereof, a valve within the valve casing for controlling the passage through said last named duct, and connections between said last named valve and said first named valve, whereby the movement of said stem may effect the operation of said last named valve, said connections including a threaded engagement between said first named valve and said last named valve, and means for holding said last named valve from turning while permitting it to reciprocate.

6. A valve mechanism comprising a casing having an internal web dividing the casing into two parts and provided with a passage having a valve seat, said casing having two ducts on opposite sides of the valve seat for external communication, a valve proper for engaging said valve seat to control the passage between said two ducts, a valve stem fixedly carrying the said valve proper and projecting to the outside of said casing, said valve stem being reciprocable in its longitudinal direction, or rotatable on its longitudinal axis, a third duct having a valve seat effecting communication with the interior of one part of said valve casing and the exterior thereof, a second valve within the valve casing for controlling the passage through said last named duct, means preventing rotation of said second valve, said second valve being purely reciprocable, a screw connection between said second valve and said first valve, whereby when said valve stem is rotated, said second valve will be reciprocated to seat and unseat itself, said valves when said second valve is unseated being susceptible of motion as a unit to simultaneously seat one of said valves while the other is unseated, and means continuously tending to move said valve stem in one direction only.

7. A valve comprising a casing having three ports, a web dividing said casing into two sections, and having a main valve seat for controlling communication between one of said ports and the other two ports, a main valve coöperating with said main valve seat, a stem carried by said main valve to project to the outside of the valve casing, a secondary valve seat adjacent to one of said ports, a secondary valve coöperating with said seat to control passage through said valve seat and port, a screw connection between said secondary valve and said main valve, a spring continuously tending to unseat said secondary valve, and a key and feather device connecting said secondary valve with said casing to hold said secondary valve from turning, said secondary valve being susceptible of reciprocation only, and said main valve being susceptible of either rotary or reciprocatory movement according as said stem is turned on its axis or reciprocated.

EDWARD J. THURBER.

Witnesses:
J. S. CAPEN,
WM. H. DOWNS.

---

Copies of this patent may be obtained for five cents each, by addressing the "Commissioner of Patents, Washington, D. C."